United States Patent
Horiuchi et al.

(10) Patent No.: US 10,802,162 B2
(45) Date of Patent: Oct. 13, 2020

(54) RADIOGRAPHIC IMAGE CAPTURING APPARATUS AND HEAT DISSIPATION METHOD

(71) Applicant: FUJIFILM Corporation, Minato-ku, Tokyo (JP)

(72) Inventors: Hisatsugu Horiuchi, Kanagawa (JP); Shinichi Kano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 363 days.

(21) Appl. No.: 15/801,331

(22) Filed: Nov. 2, 2017

(65) Prior Publication Data
US 2018/0136346 A1 May 17, 2018

(30) Foreign Application Priority Data
Nov. 15, 2016 (JP) .................. 2016-222691

(51) Int. Cl.
*G01T 1/24* (2006.01)
*G01T 7/00* (2006.01)

(52) U.S. Cl.
CPC ................ *G01T 1/244* (2013.01); *G01T 7/00* (2013.01)

(58) Field of Classification Search
None
See application file for complete search history.

(56) References Cited

U.S. PATENT DOCUMENTS 5,912,943 A 6/1999 Deucher et al.

2007/0284535 A1* 12/2007 Heismann .............. A61B 6/035
250/370.15
2009/0154648 A1 6/2009 Watanabe
(Continued)

FOREIGN PATENT DOCUMENTS

| EP | 0920241 A2 | 6/1999 |
|---|---|---|
| JP | H11-262483 A | 9/1999 |
| JP | 2012-42302 A | 3/2012 |

(Continued)

OTHER PUBLICATIONS

English language translation of the following: Office action dated Jan. 28, 2020 from the JPO in a Japanese patent application No. 2017-219348 corresponding to the instant patent application. This office action translation is submitted now in order to supplement the understanding of the cited references which are being disclosed in the instant Information Disclosure Statement.

*Primary Examiner* — Edwin C Gunberg
(74) *Attorney, Agent, or Firm* — Solaris Intellectual Property Group, PLLC

(57) ABSTRACT

A radiographic image capturing apparatus includes: a radiation detector in which a plurality of pixels for accumulating electric charges corresponding to emitted radiation are arranged; a control unit that controls the radiation detector; a radiation emission unit that emits radiation; a housing unit in which the radiation detector and the control unit are housed and which has a heat dissipation port and a radiation detection surface irradiated with the radiation emitted from the radiation emission unit; and a support unit that supports the radiation emission unit at a position facing the radiation detection surface and has a hollow portion forming a space continuing from an inside of the housing unit through the heat dissipation port.

9 Claims, 11 Drawing Sheets

(56) References Cited

U.S. PATENT DOCUMENTS

2012/0069956 A1\* 3/2012 Guery .................. A61B 6/032
378/19

FOREIGN PATENT DOCUMENTS

| JP | 2012-078367 A | 4/2012 |
| JP | 2013-176563 A | 9/2013 |
| JP | 5619203 B2 | 11/2014 |

\* cited by examiner

RADIOGRAPHIC IMAGE CAPTURING APPARATUS AND HEAT DISSIPATION METHOD

CROSS-REFERENCE TO RELATED APPLICATION

This application is based on and claims priority under 35 USC 119 from Japanese Patent Application No. 2016-222691 filed on Nov. 15, 2016, the disclosure of which is incorporated by reference herein.

BACKGROUND

Technical Field

The present disclosure relates to a radiographic image capturing apparatus and a heat dissipation method.

Related Art

A radiographic image capturing apparatus is known that captures a radiographic image by detecting a radiation, which is transmitted through a subject after being emitted from a radiation emission device, with a radiation detector.

In the radiographic image capturing apparatus, an electronic circuit functioning as a control unit for driving the radiation detector, the radiation detector, and the like are provided inside a housing unit. In the radiographic image capturing apparatus, there is a case where heat is accumulated in the housing unit due to heat generation of the electronic circuit or the like.

For this reason, for example, JP5619203B and JP2012-42302A disclose a technique for dissipating heat generated inside the radiographic image capturing apparatus.

In the known technique, however, even if the dissipation of heat inside the housing unit is performed, a sufficient heat dissipation effect is not necessarily obtained.

The present disclosure has been made in view of the above circumstances, and it is an object of the present disclosure to provide a radiographic image capturing apparatus and a heat dissipation method capable of improving the effect of dissipating the heat inside a housing unit in which a radiation detector and a control unit are housed.

SUMMARY

In order to achieve the aforementioned object, a radiographic image capturing apparatus of the present disclosure comprises: a radiation detector in which a plurality of pixels for accumulating electric charges corresponding to emitted radiation are arranged; a control unit that controls the radiation detector; a radiation emission unit that emits radiation; a housing unit in which the radiation detector and the control unit are housed and which has a heat dissipation port and a radiation detection surface irradiated with the radiation emitted from the radiation emission unit; and a support unit that supports the radiation emission unit at a position facing the radiation detection surface and has a hollow portion forming a space continuing from an inside of the housing unit through the heat dissipation port.

The radiographic image capturing apparatus of the present disclosure may further comprise a heat sink that is housed in the housing unit and is thermally coupled to the control unit.

The radiographic image capturing apparatus of the present disclosure may further comprise a heat conduction member in contact with one of the control unit and the heat sink.

In the radiographic image capturing apparatus of the present disclosure, the heat conduction member may protrude to the heat dissipation port side rather than the heat sink.

The radiographic image capturing apparatus of the present disclosure may further comprise a housing that integrally covers a region of a part of the heat sink, the radiation detector, and the control unit.

The radiographic image capturing apparatus of the present disclosure may further comprise a housing that integrally covers the radiation detector and the control unit, and the heat sink may be provided on the housing.

In the radiographic image capturing apparatus of the present disclosure, the housing may be housed in the housing unit, and a heat conduction member in contact with one of the control unit and the heat sink may be in contact with the housing.

In the radiographic image capturing apparatus of the present disclosure, the heat sink may be spaced apart from the housing unit and the support unit.

The radiographic image capturing apparatus of the present disclosure may further comprise an air blower that blows inside air from the inside of the housing unit to the heat dissipation port through a region of a fin of the heat sink.

In the radiographic image capturing apparatus of the present disclosure, the support unit may comprise a holding unit, which holds the housing unit and has an opening portion allowing the inside of the housing unit and the hollow portion to be a continuous space through the heat dissipation port in a state in which the housing unit is held, and an arm connecting the holding unit and the radiation emission unit to each other between one end and the other end, and the hollow portion may be provided over an inside of the holding unit and an inside of the arm.

In order to achieve the aforementioned object, a heat dissipation method of the present disclosure is a heat dissipation method of a radiographic image capturing apparatus comprising a radiation detector in which a plurality of pixels for accumulating electric charges corresponding to emitted radiation are arranged, a control unit that controls the radiation detector, a radiation emission unit that emits radiation, a housing unit in which the radiation detector and the control unit are housed and which has a radiation detection surface irradiated with the radiation emitted from the radiation emission unit, and a support unit that supports the radiation emission unit at a position facing the radiation detection surface. The heat dissipation method comprises dissipating heat inside the housing unit from a heat dissipation port provided in the housing unit to a hollow portion that is provided in the support unit to form a space continuing from an inside of the housing unit through the heat dissipation port.

According to the present disclosure, it is possible to improve the effect of dissipating the heat inside the housing unit in which the radiation detector and the control unit are housed.

DETAILED DESCRIPTION

Hereinafter, an embodiment of the invention will be described in detail with reference to the accompanying diagrams.

Figure 1:
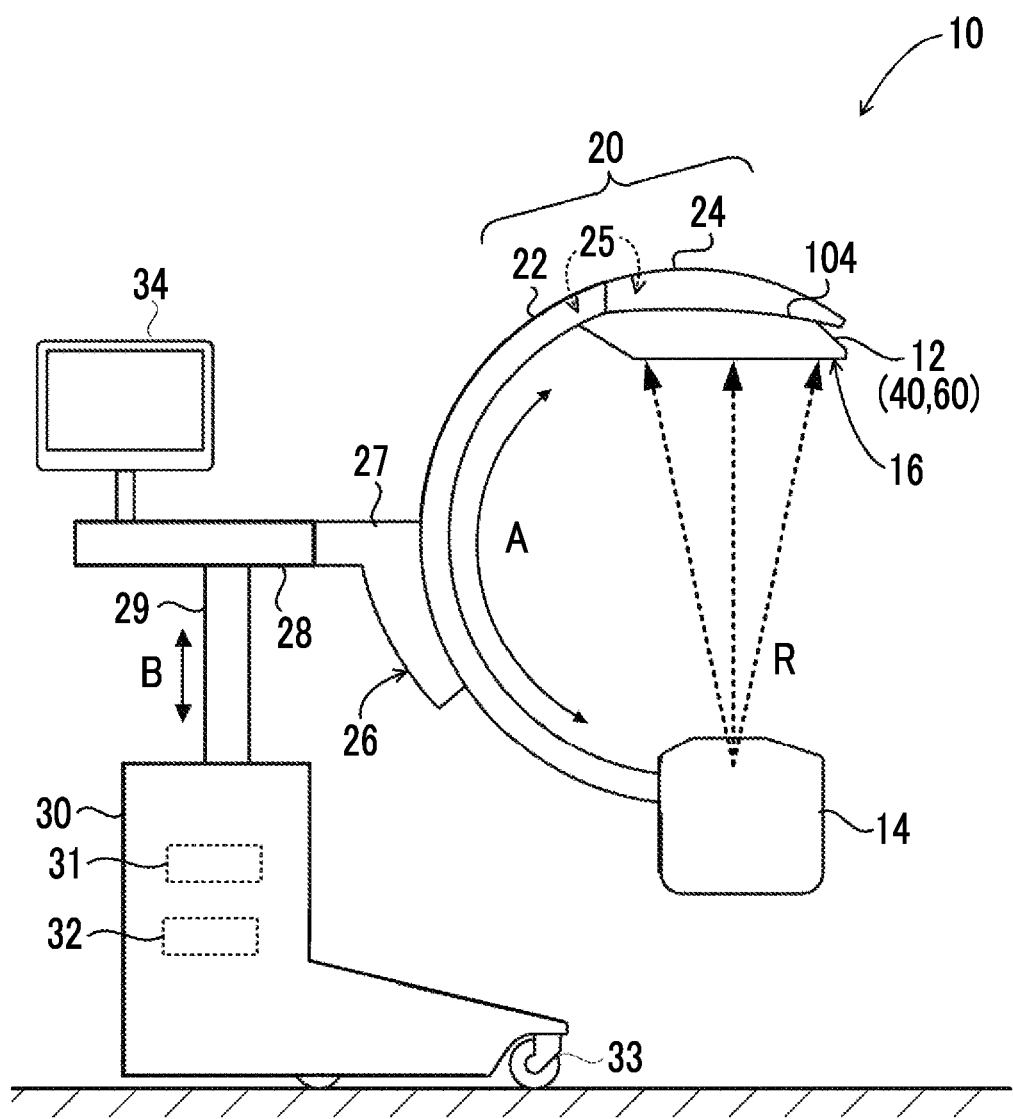
FIG. 1 is a side view showing an example of the configuration of a radiographic image capturing apparatus according to an embodiment.

First, the configuration of a radiographic image capturing apparatus 10 of the present embodiment will be described with reference to FIG. 1. As shown in FIG. 1, the radiographic image capturing apparatus 10 of the present embodiment includes a C arm 20 having an arm unit 22 and a holding unit 24.

A radiation emission unit 14 that emits a radiation R is provided at one end of the arm unit 22, and the holding unit 24 is provided at the other end. In the present embodiment, as shown in FIG. 1, the holding unit 24 holds a housing unit 12 in which a radiation detector 40 that detects the radiation R to generate image data indicating a radiographic image, a control unit 60 that controls the radiation detector 40, and the like, which will be described, are housed. A radiation detection surface 16 irradiated with the radiation R emitted from the radiation emission unit 14 is provided on a side of the housing unit 12 facing the radiation emission unit 14. In the radiographic image capturing apparatus 10 of the present embodiment, a so-called source image distance (SID) that is the distance between the radiation detection surface 16 and a radiation source (not shown) of the radiation emission unit 14 is set as a fixed value.

Inside the C arm 20 of the radiographic image capturing apparatus 10 of the present embodiment, a hollow portion 25 is provided across the arm unit 22 and the holding unit 24.

The C arm 20 is held so as to be movable in an arrow A direction shown in FIG. 1 by a C arm holding unit 26. The C arm holding unit 26 has a shaft portion 27, and the shaft portion 27 connects the C arm 20 to a bearing 28. The C arm 20 is rotatable with the shaft portion 27 as a rotation axis.

As shown in FIG. 1, the radiographic image capturing apparatus 10 of the present embodiment includes a main body unit 30 having a plurality of wheels 33 in a bottom portion thereof. A spindle 29 that extends and contracts in an arrow B direction in FIG. 1 is provided on the upper portion side in FIG. 1 of the housing of the main body unit 30. The bearing 28 is held on the spindle 29 so as to be movable in the arrow B direction.

An interface (I/F) unit 31 and a radiation source control unit 32 are built into the main body unit 30.

The I/F unit 31 has a function of communicating with a console (not shown), which performs overall control relevant to radiographic image capturing of the radiographic image capturing apparatus 10, wirelessly or by cable. The radiographic image capturing apparatus 10 of the present embodiment captures a radiographic image based on an imaging instruction received from the console through the I/F unit 31.

The radiation source control unit 32 causes a radiation source (not shown) provided in the radiation emission unit 14 to emit the radiation R based on the exposure conditions included in the imaging instruction. As an example, the radiation source control unit 32 of the present embodiment is realized by a microcomputer including a central processing unit (CPU), a memory including a read only memory (ROM) and a random access memory (RAM), and a non-volatile storage unit such as a flash memory.

A user interface 34 is provided on the main body unit 30. The user interface 34 has a function of allowing a user, such as an operator or a doctor who captures a radiographic image using the radiographic image capturing apparatus 10, to give an instruction regarding the capturing of a radiographic image and a function of providing information regarding the capturing of a radiographic image to the user. As an example of the user interface 34, a touch panel display or the like can be mentioned.

Figure 2:
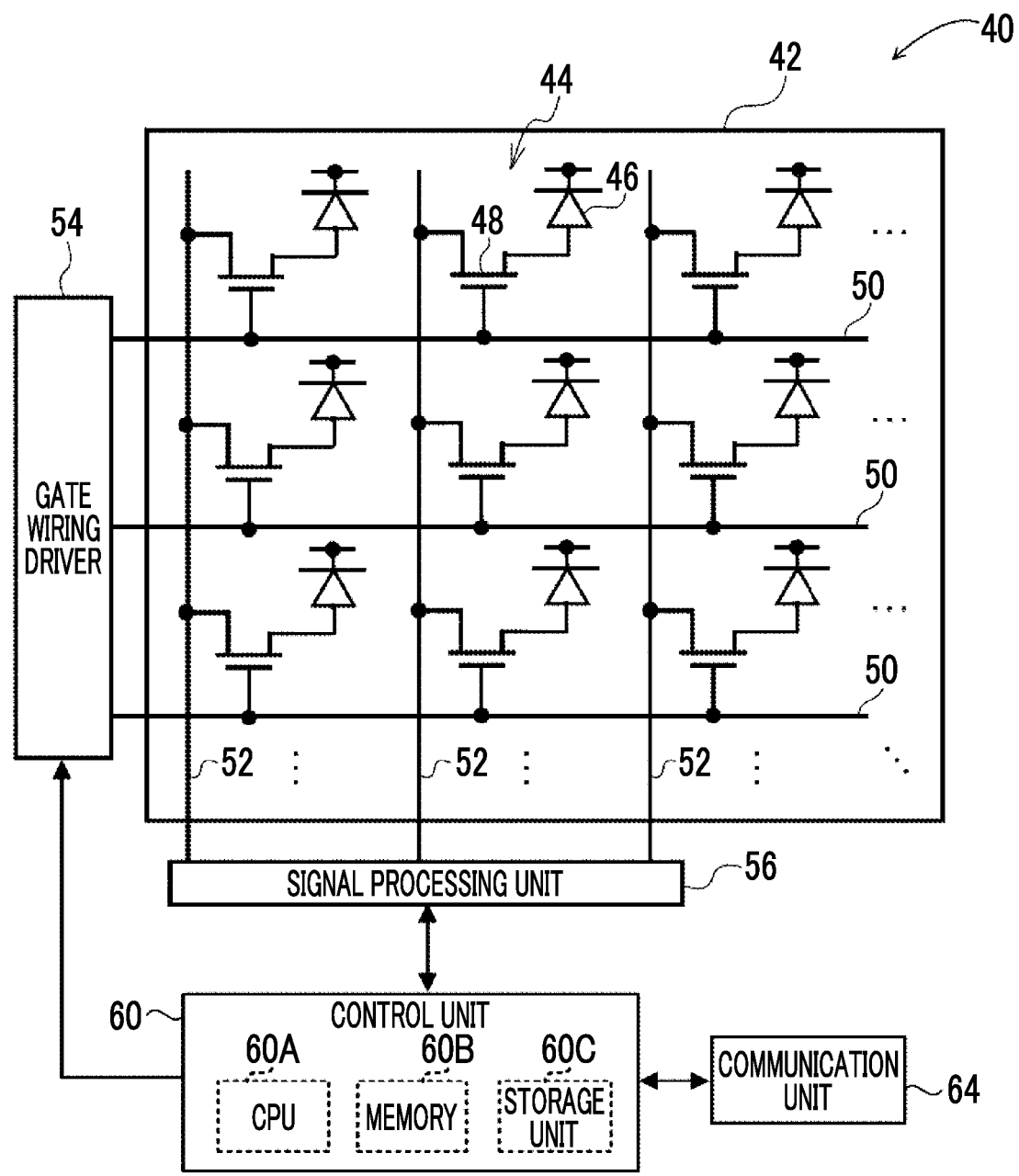
FIG. 2 is a block diagram (partial circuit diagram) showing an example of the configuration of main portions of an electrical system of a radiation detector and a control unit in the embodiment.

Next, the configuration of main portions of the electrical system of the radiation detector 40 and the control unit 60 housed in the housing unit 12 will be described with reference to FIG. 2. As shown in FIG. 2, the radiation detector 40 of the present embodiment includes a thin film transistor (TFT) substrate 42, a gate wiring driver 54, and a signal processing unit 56.

On the TFT substrate 42, a plurality of pixels 44 are provided in a two-dimensional shape in one direction (row direction in FIG. 2) and an intersection direction (column direction in FIG. 2) crossing the one direction. Each pixel 44 includes a sensor section 46 and a field effect thin film transistor (TFT; hereinafter, simply referred to as a "thin film transistor") 48.

The sensor section 46 includes an upper electrode, a lower electrode, a photoelectric conversion film, and the like (not shown). The sensor section 46 detects visible light converted from the radiation R by a scintillator (not shown), generates electric charges, and accumulates the generated electric charges. The amount of electric charges generated by the sensor section 46 increases as the amount of detected visible light increases. The thin film transistor 48 reads out the electric charges accumulated in the sensor section 46 according to a control signal, and outputs the electric charges.

On the TFT substrate 42, a plurality of gate wirings 50 arranged in the one direction for switching between on and off states of each thin film transistor 48 are provided. On the TFT substrate 42, a plurality of data wirings 52, which are arranged in the intersection direction and through which electric charges read out by the on-state thin film transistor 48 are output.

Each gate wiring 50 of the TFT substrate 42 is connected to the gate wiring driver 54, and each data wiring 52 of the TFT substrate 42 is connected to the signal processing unit 56.

The thin film transistors 48 of the TFT substrate 42 are sequentially turned on for each gate wiring 50 (in the present embodiment, in units of rows shown in FIG. 2) by a control signal supplied from the gate wiring driver 54 through the gate wiring 50. Then, the electric charges read out by the thin film transistor 48 that is turned on are transmitted as an electric signal through the data wiring 52 and are input to the signal processing unit 56. As a result, the electric charges are sequentially read out for each gate wiring 50 (in the present embodiment, in units of rows shown in FIG. 2), and image data indicating a two-dimensional radiographic image is acquired.

The signal processing unit 56 includes an amplifier circuit for amplifying the input electric signal and a sample and hold circuit (both not shown) for each data wiring 52. The electric signal transmitted through each data wiring 52 is amplified by the amplifier circuit and is then held in the sample and hold circuit. A multiplexer and an analog/digital (A/D) converter (both not shown) are sequentially connected to the output side of the sample and hold circuit. Then, electric signals held in the individual sample and hold circuits are sequentially (serially) input to the multiplexer. The electric signals sequentially selected by the multiplexer are converted into digital image data by the A/D converter, and are output to the control unit 60.

The control unit 60 includes a central processing unit (CPU) 60A, a memory 60B including a read only memory (ROM) and a random access memory (RAM), and a non-volatile storage unit 60C such as a flash memory. In the present embodiment, as an example, the control unit 60 is realized by a field programmable gate array (FPGA) 62 (refer to FIGS. 3 and 5). The CPU 60A controls the overall operation of the radiation detector 40.

In the radiographic image capturing apparatus 10 of the present embodiment, a communication unit 64 is housed inside the housing unit 12, the communication unit 64 is connected to the control unit 60, and various kinds of information including image data of radiographic images are transmitted and received to and from an external device such as a console (not shown) through the I/F unit 31 by using at least one of wireless communication or wired communication.

Figure 3:
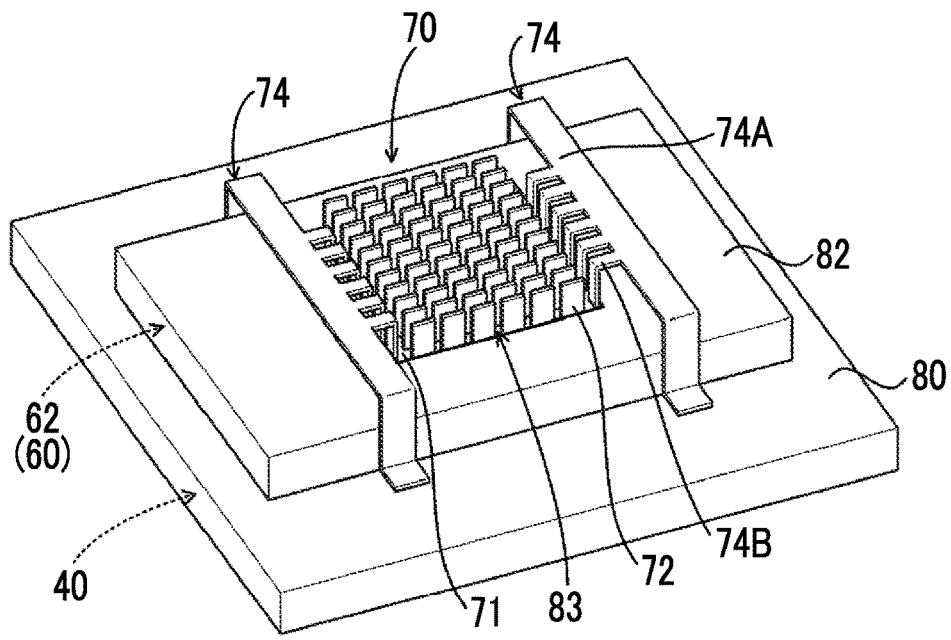
FIG. 3 is a perspective view showing an example of a radiation detector and a control unit housed in a housing unit in the embodiment.
Figure 4:
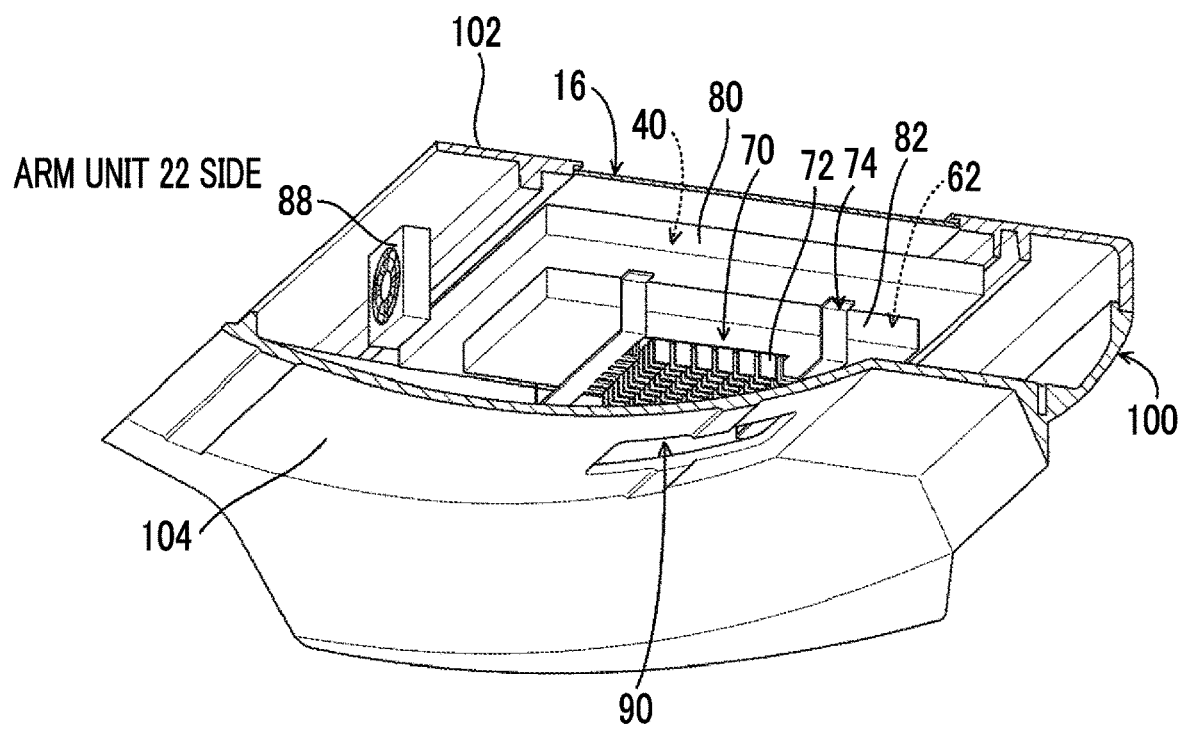
FIG. 4 is a cross-sectional view showing an example of a housing state in which a radiation detector and an FPGA unitized as shown in FIG. 3 are housed inside the housing unit.
Figure 5:
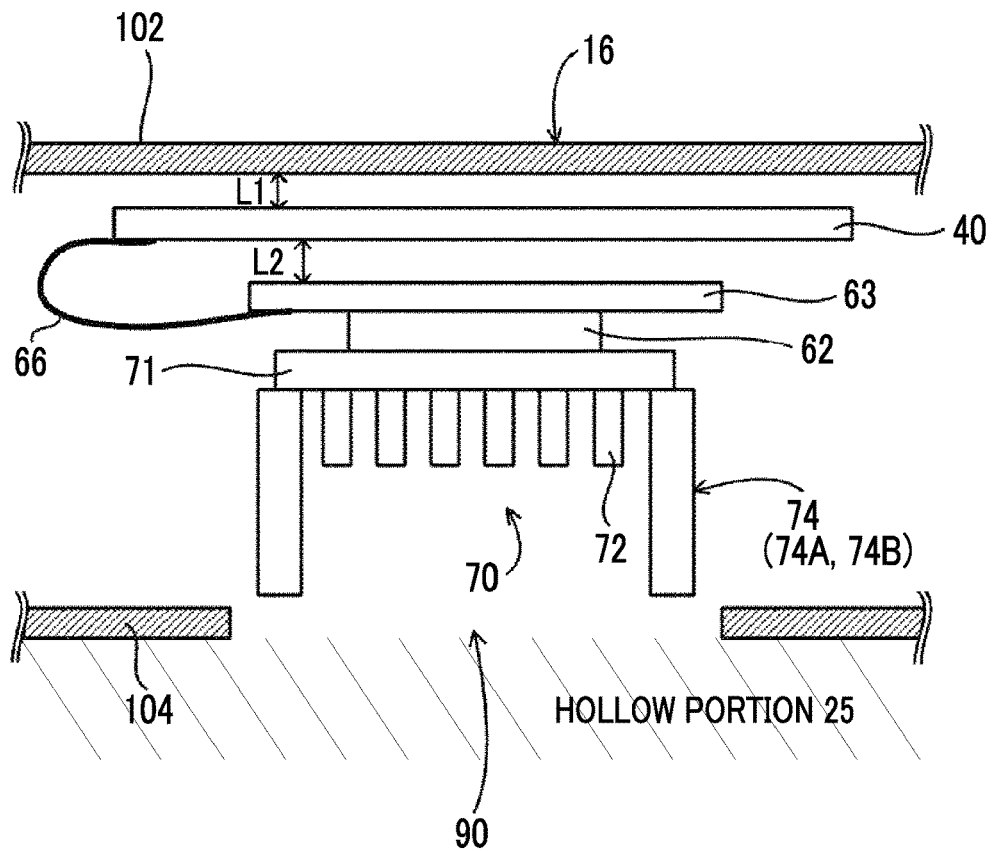
FIG. 5 is a cross-sectional view illustrating a configuration and a method for dissipating heat inside the housing unit in the example of the housing state shown in FIG. 4.
Figure 6:
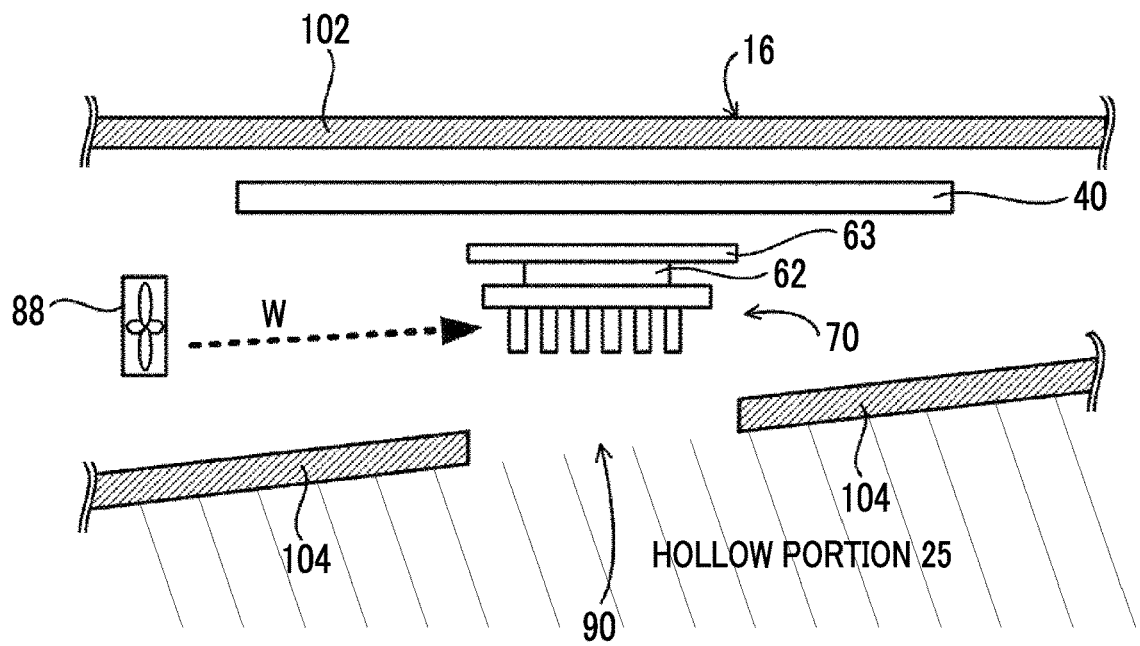
FIG. 6 is a cross-sectional view illustrating the configuration and the method for dissipating heat inside the housing unit in the example of the housing state shown in FIG. 4.

FIG. 3 is a perspective view of an example of the radiation detector 40 and the FPGA 62 housed in the housing unit 12 of the present embodiment. FIG. 4 is a cross-sectional view showing an example of a housing state in which the radiation detector 40 and the FPGA 62 unitized as shown in FIG. 3 are housed inside the housing unit 12. FIGS. 5 and 6 are cross-sectional views illustrating a configuration and a method for dissipating heat inside the housing unit 12 in the example of the housing state shown in FIG. 4. In FIG. 5, in order to avoid confusion, a heat conduction member 74 is simplified by omitting the individual shapes of a main body unit 74A and a contact unit 74B.

The radiation detector 40 of the present embodiment is covered with a housing 80 together with the gate wiring driver 54 and the signal processing unit 56. The FPGA 62 of the present embodiment is mounted on a substrate 63 (refer to FIG. 5), and is covered with a housing 82 having an opening portion 83 together with the substrate 63. In the present embodiment, the radiation detector 40 and the FPGA 62 are unitized by integrally covering the radiation detector 40 and the FPGA 62 by combining the housing 80 and the housing 82. Without being limited to the present embodiment, for example, the radiation detector 40 and the FPGA 62 may be unitized by being integrally covered with one housing.

Each of the housing 80 and the housing 82 of the present embodiment has a function as a frame ground, and has a function as a measure against electro magnetic compatibility (EMC) in the TFT substrate 42 or the FPGA 62. It is preferable to use a conductor, such as a single metal or an alloy, for the housing 80 and the housing 82. Thus, in the radiographic image capturing apparatus 10 of the present embodiment, the radiation detector 40 and the FPGA 62 are unitized to take a measure against EMC.

On the surface of the FPGA 62 mounted on the substrate 63, a heat sink 70 having a plurality of flat plate shaped fins 72 formed on a base 71, which has a rectangular shape in a plan view, is provided. As shown in FIG. 3, the fins 72 of the heat sink 70 protrude from the opening portion 83 of the housing 82 to the outside of the housing 82. Since the heat sink 70 has a function of dissipating heat generated in the FPGA 62, the heat sink 70 is thermally coupled to the FPGA 62. Therefore, it is preferable that the heat sink 70 is provided near the FPGA 62. In the present embodiment, as an example, the heat sink 70 is pressed against the FPGA 62 by an elastic member (not shown), such as a spring provided between the heat sink 70 and the substrate 63.

In the radiographic image capturing apparatus 10 of the present embodiment, a case of dissipating heat mainly due to the FPGA 62 as heat generated inside the housing unit 12 will be described.

As shown in FIG. 3, a pair of heat conduction members 74 are provided along a pair of opposite sides of the heat sink 70. From the viewpoint of heat conductivity or strength, the heat conduction member 74 is preferably metal such as aluminum, copper, brass, and iron, or an alloy thereof.

As shown in FIGS. 3 and 5, the heat conduction member 74 of the present embodiment has the main body unit 74A and the contact unit 74B. As shown in FIGS. 3 and 4 as an example, in the heat conduction member 74 of the present embodiment, the main body unit 74A is formed by a member that has bent portions each having an L shape in a cross-sectional view at both end portions and that has a long and flat plate shape as a whole. In the heat conduction member 74 of the present embodiment, the contact unit 74B is formed by a plurality of members each of which protrudes from an intermediate portion of the main body unit 74A and has a crank shape in a cross-sectional view.

In the present embodiment, the heat conduction member 74 is manufactured by integrally cutting out the main body unit 74A and the contact unit 74B from a single flat plate shaped member and performing bending processing. However, the invention is not limited to this method. For example, it goes without saying that the heat conduction member 74 may be manufactured by separately manufacturing the main body unit 74A and the contact unit 74B and bonding these to each other.

The terminal end portion of the contact unit 74B of the heat conduction member 74 is in contact with the base 71 of the heat sink 70, and the heat held in the heat sink 70 is transferred to the main body unit 74A by the contact unit 74B. In the present embodiment, a form has been described in which the terminal end portion of the contact unit 74B is in contact with the base 71. However, the invention is not limited to the form, heat may be transferred from the base 71 to the contact unit 74B. For example, the terminal end portion of the contact unit 74B and the base 71 may be spaced apart from each other at positions close to each other.

On the other hand, the main body unit 74A of the heat conduction member 74 has both end portions electrically connected to the housing 80 across the housing 82. In this manner, since the heat conduction member 74 is electrically connected to the housing 80, the heat conduction member 74 has a function as a measure against EMC.

The main body unit 74A of the present embodiment protrudes to the outside of the fins 72 of the heat sink 70 (specifically, to the side of a heat dissipation port 90 that will be described in detail later). In this manner, since the main body unit 74A of the heat conduction member 74 protrudes to the heat dissipation port 90 side rather than the fins 72 of the heat sink 70, it is possible to suppress the contact of the fins 72 with a bottom plate 104 or the like. Therefore, it is possible to prevent the external impact from being transmitted to the FPGA 62 or the radiation detector 40 through the fins 72 or the heat sink 70.

The invention is not limited to the form of the present embodiment as long as the end portion of the heat conduction member 74 protrudes to the heat dissipation port 90 side rather than the end portion of the heat sink 70. For example, in a case where the contact unit 74B protrudes to the heat dissipation port 90 side rather than the main body unit 74A, the contact unit 74B may protrude to the heat dissipation port 90 side rather than the fins 72.

As shown in FIG. 4, the housing unit 12 of the present embodiment includes a top plate 102 having the radiation detection surface 16 and a housing 100 having the bottom plate 104. The heat dissipation port 90 is provided in the bottom plate 104 of the present embodiment. In the present embodiment, as described above, the hollow portion 25 is provided inside each of the holding unit 24 and the arm unit 22, and the inside of each of the hollow portion 25 and the housing unit 12 forms a continuous space through an opening portion 92 (refer to FIG. 10) and the heat dissipation port 90 that are provided in the holding unit 24. In the present embodiment, the "continuous space" refers to a space that can be regarded as one space from the viewpoint of transferring (dissipating) the heat inside the housing unit 12. In the present embodiment, the "continuous space" is a space that is a thermodynamically closed system (space where heat moves but substances do not move; hereinafter, simply referred to as a "closed system"). In addition, the "continuous space" may not be completely closed, but is preferably a space into which at least a body fluid such as blood, moisture, and the like do not permeate.

As shown in FIGS. 4 and 5, the radiation detector 40 and the FPGA 62 that are unitized are housed in the housing unit 12 in a state in which the radiation detector 40 (housing 80) is located on the radiation detection surface 16 side (top plate 102 side) and the heat sink 70 is located on the bottom plate 104 side. In the present embodiment, as shown in FIGS. 4 and 5, the heat dissipation port 90 is provided in a region of the heat sink 70 facing the bottom plate 104.

Incidentally, as a distance L1 between the radiation detector 40 and the radiation detection surface 16 increases, the radiographic image captured by the radiation detector 40 becomes blurred. Accordingly, the image quality is lowered. For this reason, it is preferable that the distance L1 between the radiation detector 40 and the radiation detection surface 16 is as short as possible. In the radiographic image capturing apparatus 10 of the present embodiment, as shown in FIG. 5 as an example, the radiation detector 40 and the FPGA 62 are connected to each other by a flexible cable 66. However, as a distance L2 between the radiation detector 40 and the FPGA 62 increases, the influence of noise increases. Accordingly, the quality of the radiographic image captured by the radiation detector 40 is lowered. For this reason, it is preferable that the distance L2 between the radiation detector 40 and the FPGA 62 is also as short as possible.

As described above, it is preferable that the heat sink 70 and the FPGA 62 are close to each other. For this reason, the distance between the heat sink 70 and the heat dissipation port 90 may be relatively long.

Therefore, in the radiographic image capturing apparatus 10 of the present embodiment, as shown in FIGS. 4 and 5 as an example, the main body unit 74A of the heat conduction member 74 protrudes toward the heat dissipation port 90. This makes it easier for the heat inside the housing unit 12 to be dissipated from the heat dissipation port 90 to the hollow portion 25 in the holding unit 24 through the main body unit 74A of the heat conduction member 74.

In the radiographic image capturing apparatus 10 of the present embodiment, as shown in FIGS. 4 and 6 as an example, a fan 88 for blowing the inside air from the inside of the housing unit 12 to the heat dissipation port 90 through the region of the fins 72 of the heat sink 70 is provided on the arm unit 22 side inside the housing unit 12. In the present embodiment, the "inside air" refers to gas inside the housing unit 12 (in the present embodiment, air as an example).

In the radiographic image capturing apparatus 10 of the present embodiment, as an example, control to drive the fan 88 according to the imaging instruction received through the I/F unit 31 is performed. Specifically, the fan 88 is driven according to the timing at which the FPGA 62 is driven. The fan 88 of the present embodiment is an example of an air blower of the disclosed technology. In FIG. 6, for the sake of simplicity, the description of the heat conduction member 74 is omitted.

As shown in FIGS. 4 and 6 as an example, the bottom plate 104 of the housing unit 12 of the present embodiment is inclined from the arm unit 22 side where the fan 88 is provided toward the distal end portion, and the distance between the top plate 102 and the bottom plate 104 gradually decreases toward the distal end portion. The bottom plate 104 of the present embodiment is gently curved from the arm unit 22 side toward the distal end portion as shown in FIG. 4 as an example. By forming the bottom plate 104 in this manner, an air blow W by the fan 88 easily passes through the heat dissipation port 90 through the region of the fins 72 of the heat sink 70.

Next, an operation of the radiographic image capturing apparatus 10 of the present embodiment will be described.

First, heat dissipation in general closed systems (closed systems 200 and 202) having different volumes (surface areas) will be described with reference to FIGS. 7 and 8.

Figure 7:
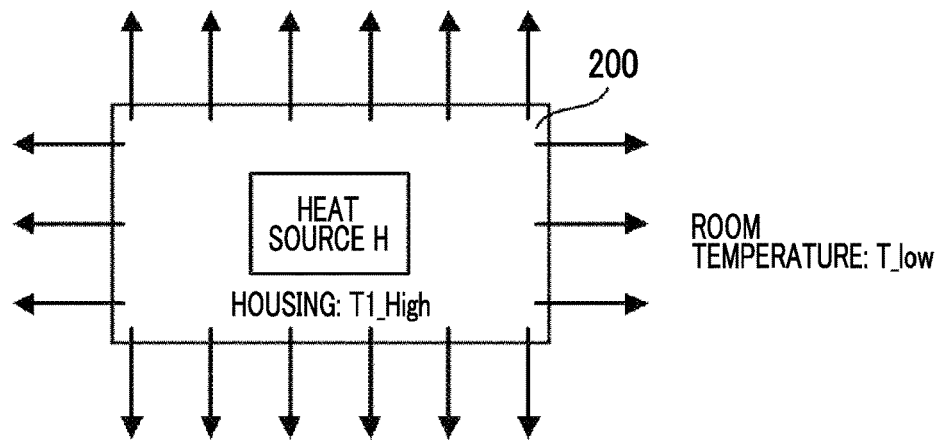
FIG. 7 is an explanatory diagram illustrating heat dissipation in a general closed system.

In the case of the closed system 200 shown in FIG. 7, assuming that the amount of heat emitted from a heat source H is W, the surface area of the closed system 200 is A1, the internal temperature of the closed system 200 is T1_High, room temperature is T_low, and a heat transfer coefficient is h, the following Equation (1) is satisfied.

$$W = A1 \times h \times (T1\_High - T\_low) \quad (1)$$

Figure 8:
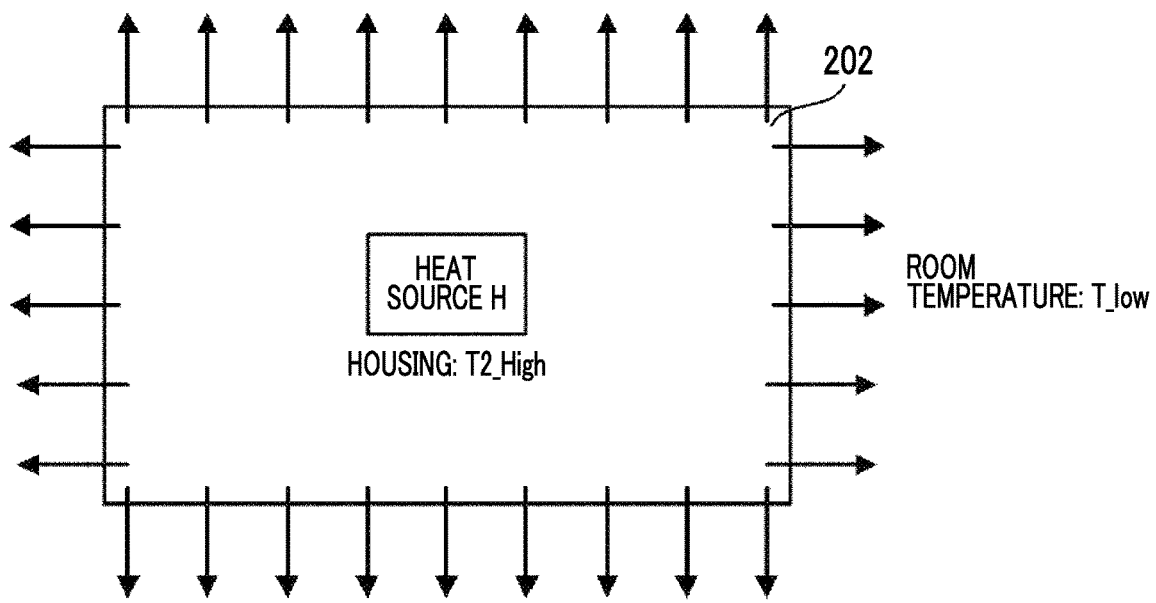
FIG. 8 is an explanatory diagram illustrating heat dissipation in a general closed system having a larger volume (surface area) than the closed system shown in FIG. 7.

On the other hand, the closed system 202 shown in FIG. 8 has a larger volume (surface area) than the closed system 200. In the case of the closed system 202 s, assuming that the surface area of the closed system 202 is A2 and the internal temperature of the closed system 202 is T2_High, the following Equation (2) is satisfied.

$$W = A2 \times h \times (T2\_High - T\_low) \quad (2)$$

As described above, since the surface area A2 is larger than the surface area A1, the relationship of the following Expression (3) is satisfied from the above Equations (1) and (2).

$$T2\_High < T1\_High \quad (3)$$

From the above Expression (3), it can be seen that, in the closed system, the larger the volume (surface area), the lower the internal temperature of the closed system, that is, the heat dissipation effect improves.

Next, dissipation of heat in the housing unit 12 of the radiographic image capturing apparatus 10 will be described with reference to FIGS. 9 to 11. As described above, in the radiographic image capturing apparatus 10 of the present embodiment, the heat source H is the FPGA 62.

First, for the sake of comparison, heat dissipation in a case where the housing unit 12 is a closed system unlike the radiographic image capturing apparatus 10 of the present embodiment will be described with reference to FIG. 9.

Figure 9:
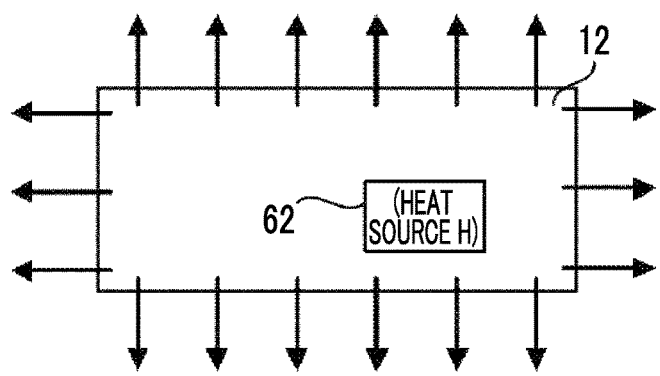
FIG. 9 is an explanatory diagram illustrating heat dissipation in a case where the housing unit is a closed system, unlike in the radiographic image capturing apparatus of the embodiment, for the sake of comparison.

In the case shown in FIG. 9, assuming that the surface area of the housing unit 12 is X0, as described above, the internal temperature of the housing unit 12, that is, the heat dissipation effect depends on the surface area X0 of the housing unit 12.

On the other hand, heat dissipation in a case where the fan 88 is not driven in the radiographic image capturing apparatus 10 of the present embodiment will be described with reference to FIG. 10. In FIG. 10, in order to avoid confusion, illustration of the fan 88 is omitted.

Figure 10:
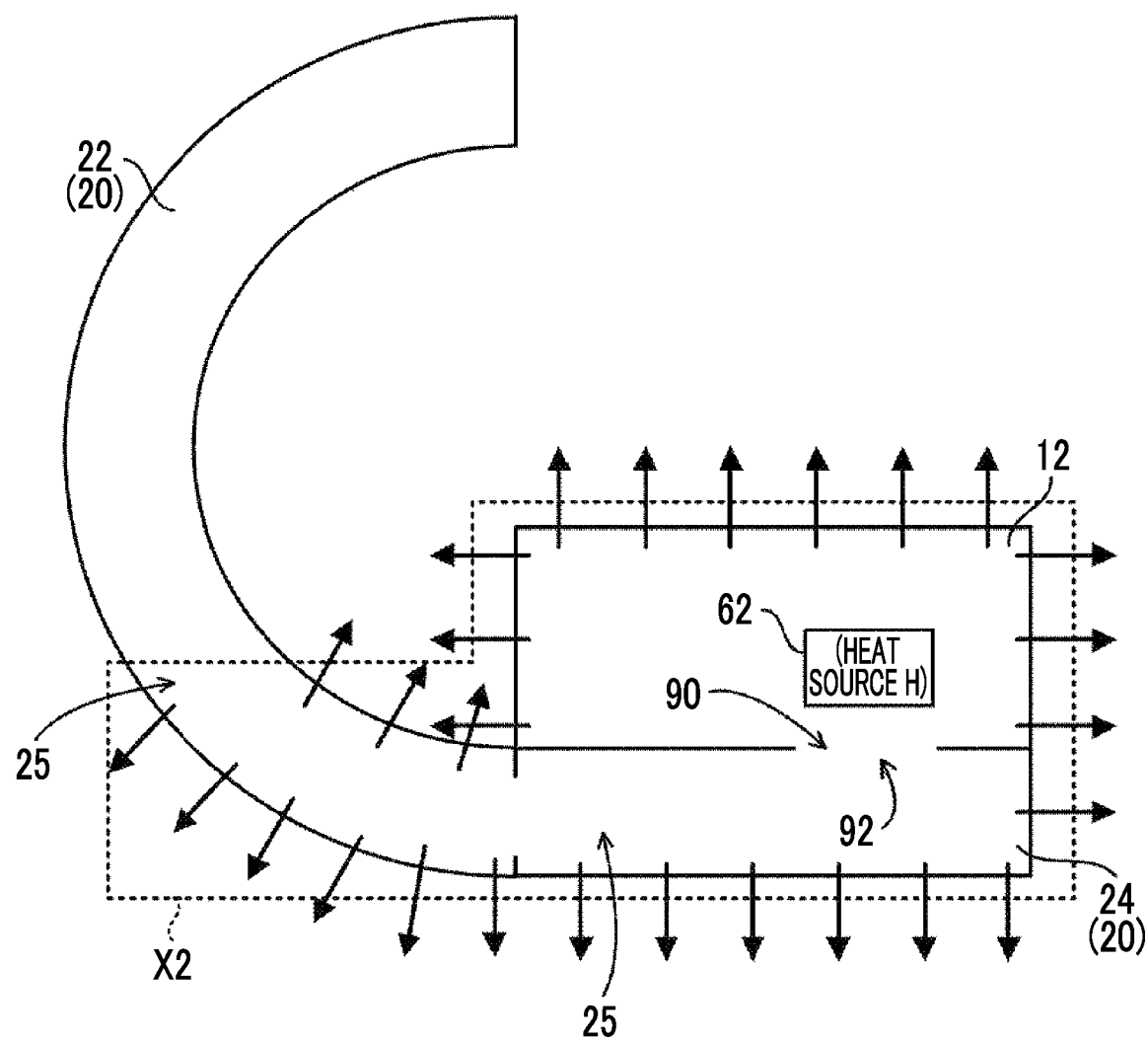
FIG. 10 is an explanatory diagram illustrating heat dissipation in a case where a fan is not driven in the radiographic image capturing apparatus of the embodiment.

As shown in FIG. 10, in the radiographic image capturing apparatus 10 of the present embodiment, the hollow portion 25 serving as a space continuing from the inside of the housing unit 12 through the heat dissipation port 90 of the housing unit 12 and the opening portion 92 of the holding unit 24 is formed in the C arm 20. For this reason, in the radiographic image capturing apparatus 10 of the present embodiment, the continuous space of the inside of the housing unit 12 and the hollow portion 25 becomes one closed system. Therefore, since the inside air of the housing unit 12 flows into the hollow portion 25 through the heat dissipation port 90 and the opening portion 92, the internal temperature of the housing unit 12, that is, the heat dissipation effect depends on the surface area X2 of a region X2 to which the heat inside the housing unit 12 is transferred.

Heat dissipation in the case of operating the fan 88 in the radiographic image capturing apparatus 10 of the present embodiment will be described with reference to FIG. 11.

Figure 11:
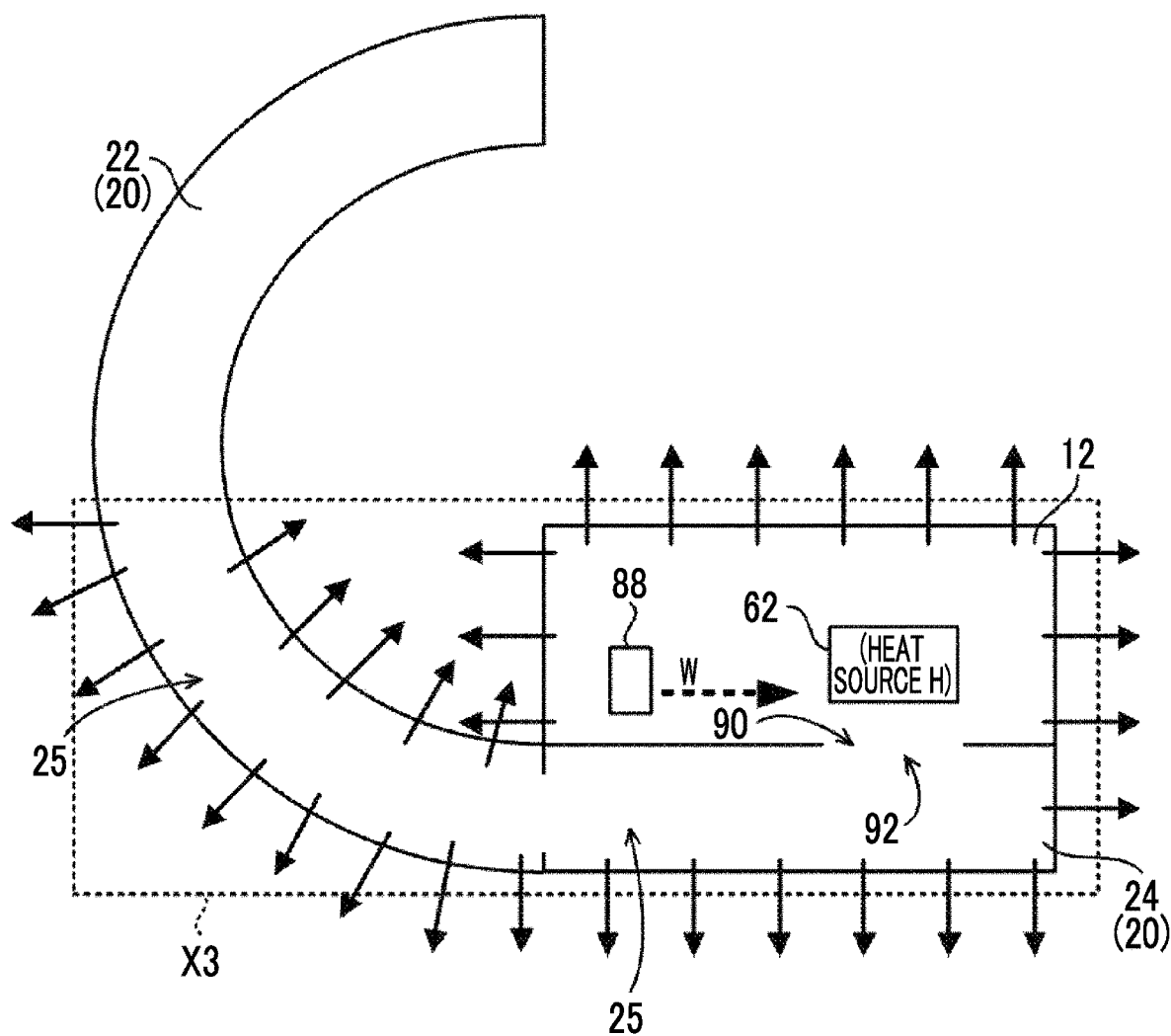
FIG. 11 is an explanatory diagram illustrating heat dissipation in a case where a fan is driven in the radiographic image capturing apparatus of the embodiment.

In the case shown in FIG. 11, unlike the case shown in FIG. 10, by driving the fan 88, the air blow W is directed to the heat dissipation port 90 through the heat source H (FPGA 62; more specifically, the above-described region of the fins 72 of the heat sink 70). Therefore, in the radiographic image capturing apparatus 10 in the case shown in FIG. 11, it becomes easy to dissipate the heat inside the housing unit 12, and the inside air of the housing unit 12 can flow over a wider range (to the inside) in the C arm 20. Therefore, in the case shown in FIG. 11, a region X3 to which the heat inside the housing unit 12 is transferred is larger than the region X2 shown in FIG. 10, and the surface area X3 of the region X3 is larger than the surface area X2 of the region X2. In the same manner as described above, the internal temperature of the housing unit 12, that is, the heat dissipation effect depends on the surface area X3 of the region X3 to which the heat inside the housing unit 12 is transferred.

Thus, the surface area X2 is larger than the surface area X1, and the surface area X3 is larger than the surface area X2. Therefore, by forming the housing unit 12 and the hollow portion 25 as a single closed system as in the radiographic image capturing apparatus 10 of the present embodiment, the heat dissipation effect is improved. In addition, in the radiographic image capturing apparatus 10 of the present embodiment, the heat dissipation effect is further improved by driving the fan 88 inside the housing unit 12.

Figure 12:
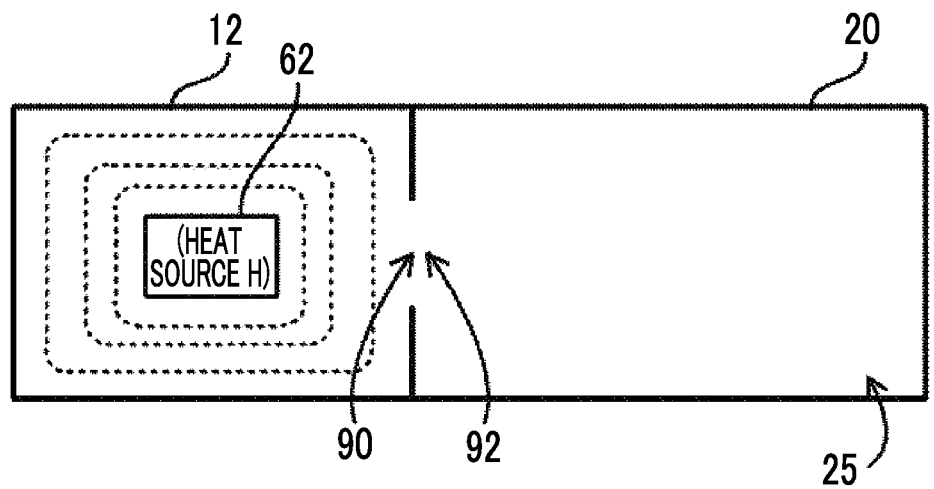
FIG. 12 is an explanatory diagram schematically showing a closed system regarding a change in the internal temperature of a housing unit in a housing unit of a radiographic image capturing apparatus.
Figure 13:
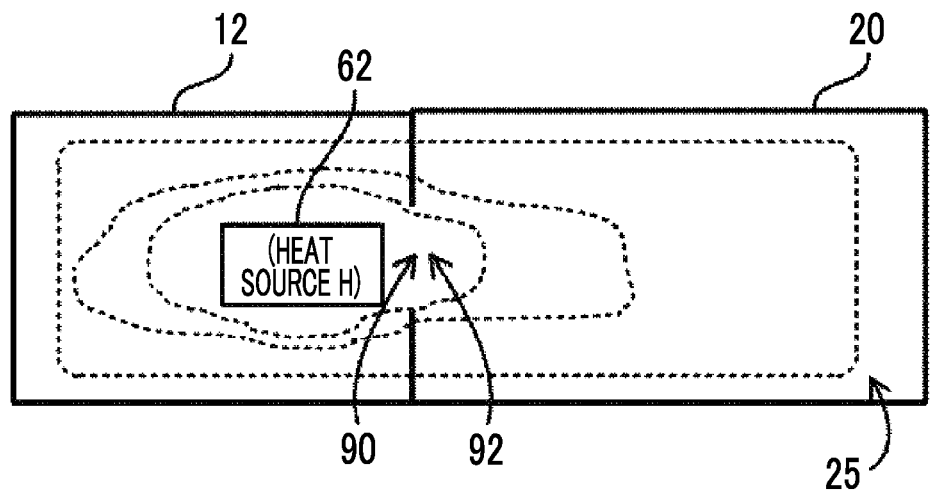
FIG. 13 is an explanatory diagram schematically showing a closed system regarding a change in the internal temperature of a housing unit in a housing unit of a radiographic image capturing apparatus in a state where a heat source is disposed in the vicinity of a heat dissipation port compared with the case shown in FIG. 12.

A change in the internal temperature of the housing unit 12 according to the position of the heat source H in the housing unit 12 of the radiographic image capturing apparatus 10 will be described with reference to FIGS. 12 and 13 schematically showing a closed system. As described above, in the radiographic image capturing apparatus 10 of the present embodiment, the heat source H is the FPGA 62. In FIGS. 12 and 13, the internal temperature of the housing unit 12 is shown using dotted lines as isothermal lines. A state in which, with the FPGA 62 as the heat source H at the center, the FPGA 62 has the highest temperature and the temperature gradually decreases is shown by isothermal lines.

First, the temperature in a case where the FPGA 62 that is the heat source H is provided inside the housing unit 12 spaced apart from the heat dissipation port 90 (opening portion 92) will be described with reference to FIG. 12.

In FIG. 12, since the FPGA 62 that is the heat source H is spaced apart from the heat dissipation port 90 (opening portion 92), the inside air of the housing unit 12 hardly reaches the hollow portion 25. Accordingly, FIG. 12 shows that the heat of the FPGA 62 is transferred only inside the housing unit 12.

On the other hand, in FIG. 13, since the FPGA 62 that is the heat source H is located in the vicinity of the heat dissipation port 90 (opening portion 92), the inside air of the housing unit 12 easily reaches the hollow portion 25. Accordingly, FIG. 13 shows that the heat of the FPGA 62 is transferred to the hollow portion 25.

As described above, the larger the surface area of the closed system, the better the heat dissipation effect. Therefore, in a case where the FPGA 62 is located in the vicinity of the heat dissipation port 90 (the opening portion 92) as shown in FIG. 13, the heat dissipation effect is improved.

In the radiographic image capturing apparatus 10 of the present embodiment, however, in a case where the radiation detector 40 and the FPGA 62 are unitized as described above, the FPGA 62 itself cannot be disposed in the vicinity of the heat dissipation port 90 (opening portion 92). Therefore, in the radiographic image capturing apparatus 10 of the present embodiment, the heat conduction member 74 for transferring the heat of the FPGA 62 through the heat sink 70 protrudes toward the heat dissipation port 90 (opening portion 92) as described above. Due to the heat conduction member 74, the same state as the state shown in FIG. 13 is obtained. Therefore, according to the radiographic image capturing apparatus 10 of the present embodiment, the heat dissipation effect is improved.

As described above, the radiographic image capturing apparatus 10 of the present embodiment includes: the radiation detector 40 in which a plurality of pixels 44 for accumulating electric charges corresponding to the emitted radiation R are arranged; the FPGA 62 that is the control unit 60 for controlling the radiation detector 40; the radiation emission unit 14 for emitting the radiation R; the housing unit 12 in which the radiation detector 40 and the FPGA 62 are housed and which has the heat dissipation port 90 and the radiation detection surface 16 irradiated with the radiation R emitted from the radiation emission unit 14; and the C arm 20 that supports the radiation emission unit 14 at a position facing the radiation detection surface 16 and has the hollow portion 25 forming a space continuing from the inside of the housing unit 12 through the heat dissipation port 90. The C arm 20 of the present embodiment is an example of a support unit of the disclosed technology.

As described above, according to the radiographic image capturing apparatus 10 of the present embodiment, since the heat of the housing unit 12 can be dissipated to the inside of the C arm 20 through heat dissipation port 90, it is possible to improve the effect of dissipating the heat inside the housing unit 12 in which the radiation detector 40 and the FPGA 62 are housed.

Figure 14A:
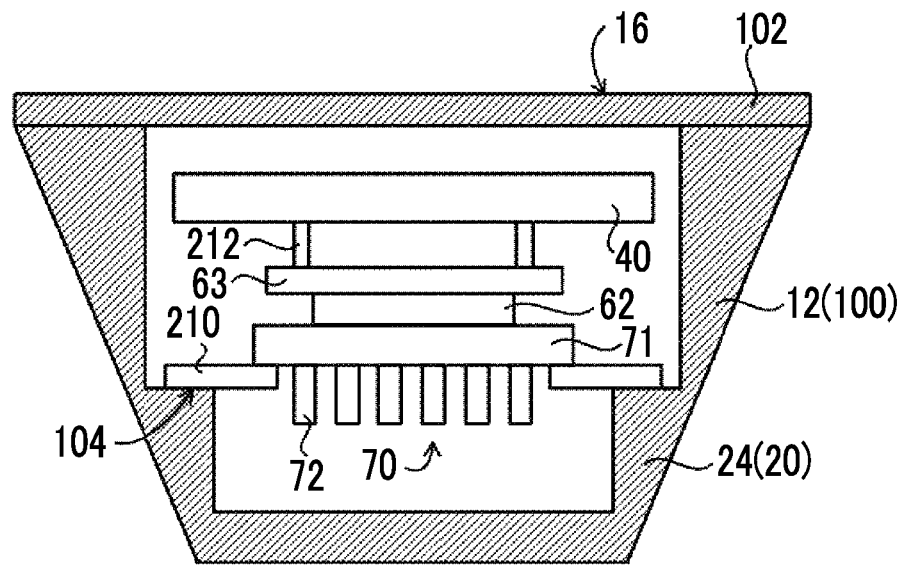
FIG. 14A is an explanatory diagram illustrating the reason why it is not preferable to connect a heat sink directly to a C arm.
Figure 14B:
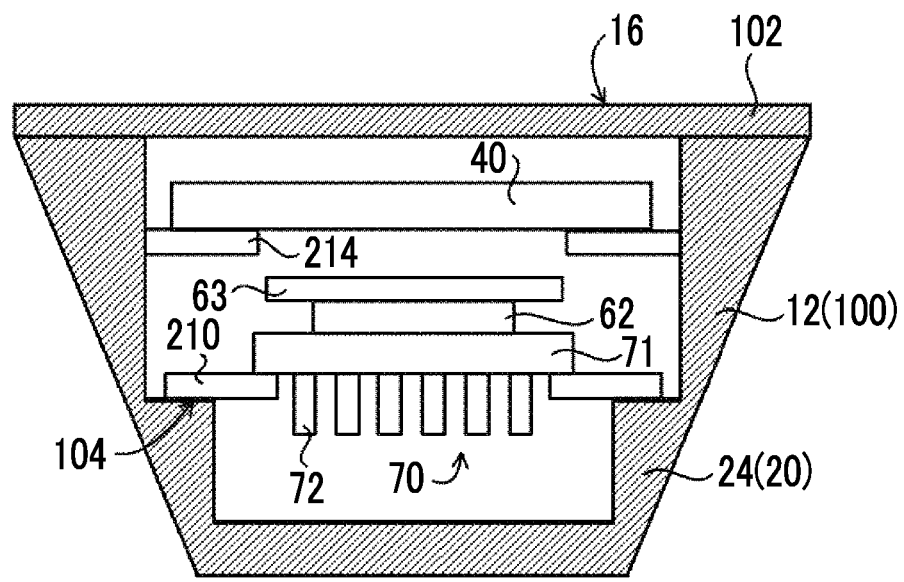
FIG. 14B is an explanatory diagram illustrating the reason why it is not preferable to connect the heat sink directly to the C arm.

Incidentally, from the viewpoint of enhancing the heat dissipation effect of the heat sink 70, it is conceivable to directly connect the heat sink 70 to the C arm 20. However, this is not preferable for the following reasons to be described with reference to FIGS. 14A and 14B. FIGS. 14A and 14B show different cases from the radiographic image capturing apparatus 10 of the present embodiment, but the same reference numerals as those used in the radiographic image capturing apparatus 10 of the present embodiment are used for convenience of explanation.

FIGS. 14A and 14B show cases where the base 71 of the heat sink 70 is connected to the bottom plate 104 by a high heat conductivity member 210 having high heat conductivity.

FIG. 14A shows a case where the radiation detector 40 is connected to the substrate 63 by a connecting member 212. In this case, since the substrate 63 supports the radiation detector 40 with the connecting member 212 interposed therebetween, unintended excessive force may be applied to the connecting member 212 or the vicinity of the connecting member 212 in the substrate 63. Accordingly, there is concern from the viewpoint of strength.

On the other hand, FIG. 14B shows a case where the radiation detector 40 is directly connected to the housing 100 of the housing unit 12 by a connecting member 214. In this case, due to manufacturing error of the radiation detector 40, connection error with the housing unit 12, or the like, the larger unintended excessive force may be generated. For this reason, it is necessary to use a material having low rigidity for the connecting member 214 or the high heat conductivity member 210. However, it may be difficult to connect the heat sink 70, the holding unit 24 or the radiation detector 40, and the housing unit 12 to each other. For example, in the case of pressing the heat sink 70 against the FPGA 62 as in the radiographic image capturing apparatus 10 of the present embodiment, the pressing becomes difficult in a case where the rigidity of the high heat conductivity member 210 is low. Therefore, it is not preferable to reduce the rigidity of the high heat conductivity member 210. In particular, in the case of a movable apparatus such as the radiographic image capturing apparatus 10 of the present embodiment, it is preferable that the high heat conductivity member 210 has high rigidity considering vibration due to movement.

In a case where the heat sink 70 and the holding unit 24 of the C arm 20 are connected to each other as shown in FIGS. 14A and 14B, electric noise may be transmitted from the C arm 20 to the radiation detector 40 or the FPGA 62 through the high heat conductivity member 210. As such electric noise, for example, noise caused by an electric scalpel or the like can be mentioned. As a general member having high heat conductivity, metal or carbon can be mentioned. However, since these materials have high conductivity and are easy to conduct electric noise, electric noise is easily transmitted. In contrast, since insulating members having high heat conductivity are not common, use of such members causes large difficulties.

In a case where the heat sink 70 and the holding unit 24 of the C arm 20 are connected to each other as shown in FIGS. 14A and 14B, there is a problem that impact given to the C arm 20 or the holding unit 24 due to the contact of the user or the subject to be imaged or the like is easily transmitted to the radiation detector 40 or the FPGA 62.

In addition, in a case where the heat sink 70 and the holding unit 24 of the C arm 20 are connected to each other as shown in FIGS. 14A and 14B, heat is locally transferred to the place of the connected holding unit 24. In this case, there is a problem that the temperature becomes high compared with a case where heat is transferred to the entire C arm 20.

On the other hand, as described above, in the radiographic image capturing apparatus 10 of the present embodiment, since the C arm 20 (holding unit 24) is not directly connected to the heat sink 70, concern that the above problem described with reference to FIGS. 14A and 14B occurs is suppressed.

In the present embodiment, the form in which the radiation detector 40 and the FPGA 62 are unitized has been described. However, the invention is not limited to the form, and the radiation detector 40 and the FPGA 62 may not be unitized.

Although the case where the heat conduction member 74 is in contact with the heat sink 70 has been described in the present embodiment, it is preferable that the heat conduction member 74 is in contact with at least one of the FPGA 62 or the heat sink 70. However, as long as heat is transferred from the heat sink 70 or the FPGA 62, the heat conduction member 74 may be in contact with neither the heat sink 70 nor the FPGA 62.

Figure 15:
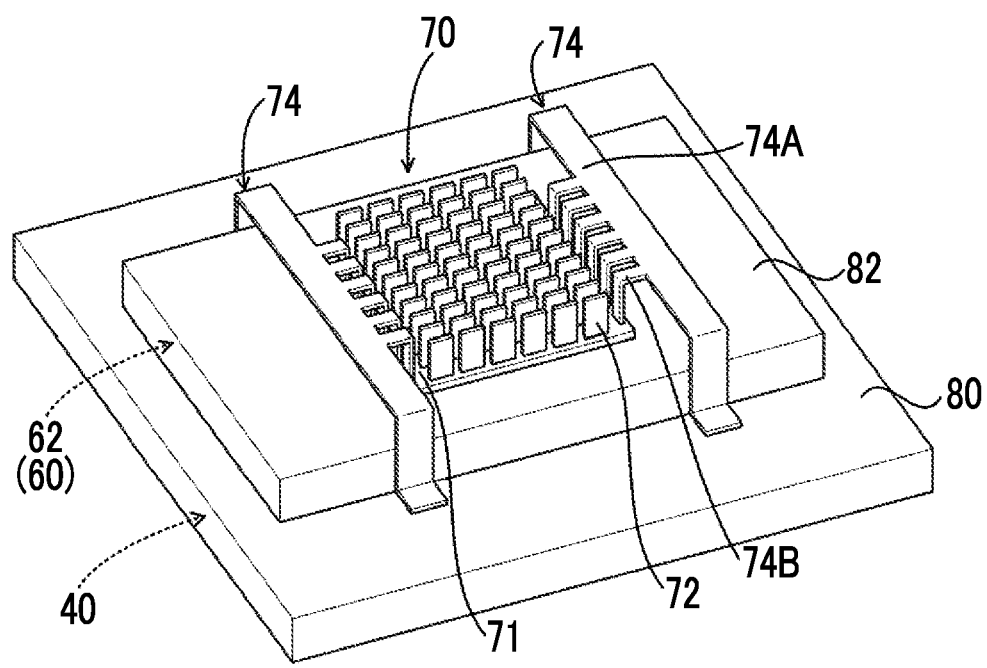
FIG. 15 is a perspective view showing another example of the radiation detector and the control unit housed in the housing unit of the embodiment.

In the present embodiment, the form has been described in which the heat sink 70 is provided on the surface of the FPGA 62 and a part of the base 71 of the heat sink 70 is covered with the housing 82. However, it is needless to say that the invention is not limited to the form. For example, as shown in FIG. 15, in a case where the FPGA 62 is covered with the housing 82 in which the opening portion 83 is not provided, the heat sink 70 may be provided in a region covering the FPGA 62 of the housing 82.

In the present embodiment, the form has been described in which the radiographic image capturing apparatus 10 includes one FPGA 62. However, the number of FPGAs 62 provided in the radiographic image capturing apparatus 10 is not particularly limited. For example, a plurality of FPGAs 62 may be provided. In this case, the heat sink 70 may be provided for each of the plurality of FPGAs 62. Alternatively, for the plurality of FPGAs 62, for example, one heat sink 70 covering all of the plurality of FPGAs 62 may be provided.

In addition, it is needless to say that the shape, size, arrangement position, and the like of the heat conduction member 74 are not limited to the present embodiment. Other examples of the form of the heat conduction member 74 will be described with reference to FIGS. 16A to 16D. FIGS. 16A to 16D are diagrams schematically showing the states of the radiation detector 40 (housing 80), the FPGA 62 (housing 82), the heat sink 70, and the heat conduction member 74 viewed from the side where the fins 72 protrude. In FIGS. 16A to 16D, illustration of the fins 72 is omitted.

Figure 16A:
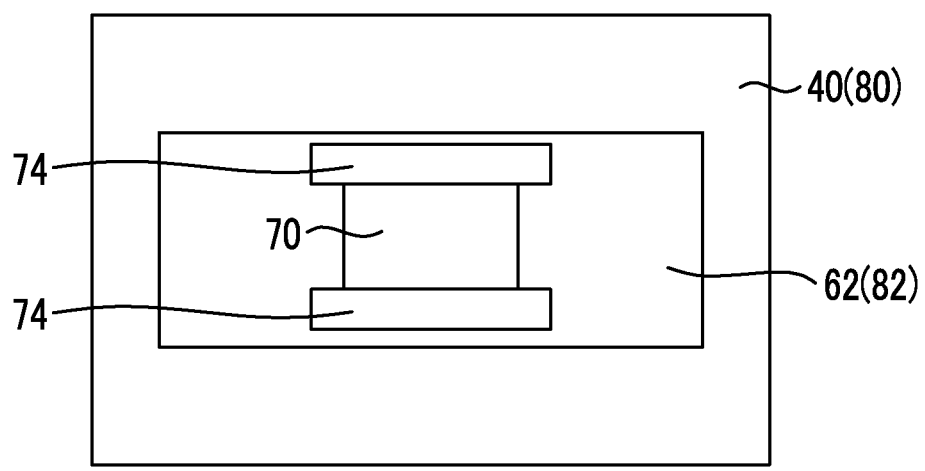
FIG. 16A is a plan view schematically showing another example of the form of a heat conduction member of the embodiment.

For example, as shown in FIG. 16A, unlike in the radiographic image capturing apparatus 10 (refer to FIG. 3) of the present embodiment, a pair of heat conduction members 74 may be provided along a pair of opposite sides of the heat sink 70. In the form shown in FIG. 16A, since the contact unit 74B (not shown in FIG. 16A) of the heat conduction member 74 is not provided on the path of the air blow W from the fan 88 to the heat dissipation port 90, the air blow W easily passes through the heat sink 70.

Figure 16B:
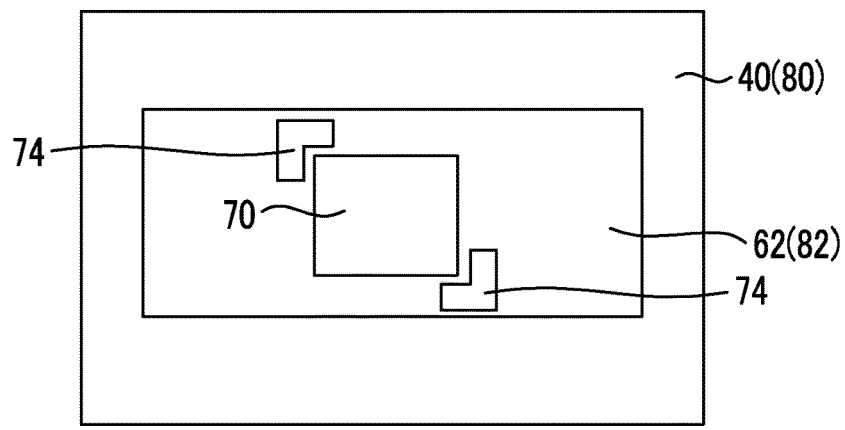
FIG. 16B is a plan view schematically showing still another example of the form of the heat conduction member of the embodiment.

For example, as shown in FIG. 16B, the heat conduction member 74 shaped to surround a part of a corner portion of the heat sink 70 may be provided. In the form shown in FIG. 16B, since the effect of suppressing the contact of the fins 72 with the bottom plate 104 or the like is enhanced, the effect of suppressing the transmission of external impact to the FPGA 62 or the radiation detector 40 through the fins 72 or the heat sink 70 is enhanced. It is needless to say that the position of each corner portion of the heat sink 70 surrounded by the heat conduction member 74 is not limited to the form shown in FIG. 16B.

Figure 16C:
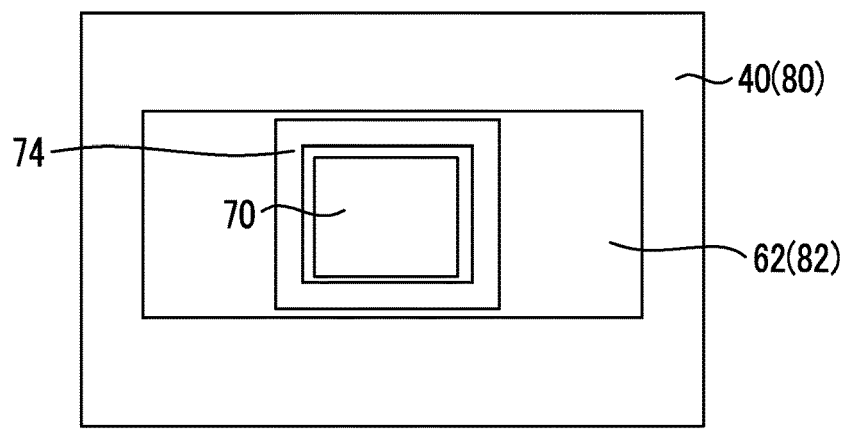
FIG. 16C is a plan view schematically showing still another example of the form of the heat conduction member of the embodiment.

For example, as shown in FIG. 16C, the heat conduction member 74 shaped to surround the entire heat sink 70 may be provided. In this case, the region surrounding the heat sink 70 is larger than that in the form shown in FIG. 16B. Accordingly, in the form shown in FIG. 16C, contact of the fins 72 with the bottom plate 104 or the like can be further suppressed. Therefore, according to the heat conduction member 74 in the form shown in FIG. 16C, the effect of suppressing the transmission of external impact to the FPGA 62 or the radiation detector 40 through the fins 72 or the heat sink 70 is enhanced.

Figure 16D:
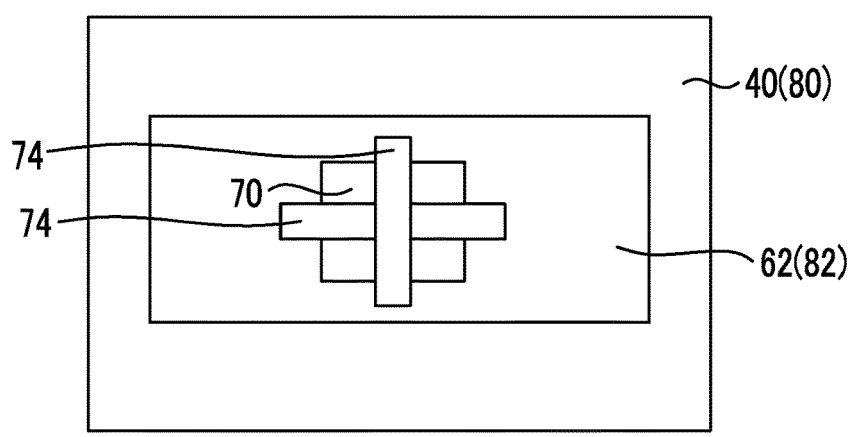
FIG. 16D is a plan view schematically showing still another example of the form of the heat conduction member of the embodiment.

For example, as shown in FIG. 16D, two heat conduction members 74 crossing each other in the vicinity of the central portion of the heat sink 70 may be provided. For example, in the FPGA 62, since heating does not occur uniformly, heat generation unevenness (temperature gradient) may occur. As a result, since the entire surface of the heat sink 70 facing the FPGA 62 does not generate heat uniformly, heat generation unevenness (temperature gradient) may occur. According to the heat conduction member 74 in the form shown in FIG. 16D, the effect of suppressing the heat generation unevenness (temperature gradient) on the surface of the heat sink 70 facing the FPGA 62 can be obtained.

In addition, it is needless to say that both the size and the shape of the heat dissipation port 90 are not limited to the size and the shape described in the present embodiment.

In the present embodiment, the form has been described in which the technique of the present disclosure is applied to the radiographic image capturing apparatus 10 including the C arm 20. However, it is needless to say that the invention is not limited to the radiographic image capturing apparatus 10 of the embodiment. For example, the technique of the present disclosure may also be applied to a so-called X-ray television for observing the inside of the body in real time using the radiation R transmitted through the body or the like.

The configuration, operation, and the like of the radiographic image capturing apparatus 10 described in the above embodiment are examples, and it is needless to say that these can be changed according to the circumstances within the scope not deviating from the spirit of the invention.

What is claimed is:

1. A radiographic image capturing apparatus, comprising:
    a radiation detector in which a plurality of pixels for accumulating electric charges corresponding to emitted radiation are arranged;
    a control unit that controls the radiation detector;
    a radiation emission unit that emits radiation;
    a housing unit in which the radiation detector and the control unit are housed and which has a heat dissipation port and a radiation detection surface irradiated with the radiation emitted from the radiation emission unit;
    a support unit that supports the radiation emission unit at a position facing the radiation detection surface and has a hollow portion forming a space continuing from an inside of the housing unit through the heat dissipation port;
    a heat sink that is housed in the housing unit and is thermally coupled to the control unit; and
    a heat conduction member that protrudes further toward the heat dissipation port than the heat sink.

2. The radiographic image capturing apparatus according to claim 1;
    wherein the heat conduction member is in contact with one of the control unit and the heat sink.

3. The radiographic image capturing apparatus according to claim 1, further comprising:
    a housing that integrally covers a region of a part of the heat sink, the radiation detector, and the control unit.

4. The radiographic image capturing apparatus according to claim 1, further comprising:
    a housing that integrally covers the radiation detector and the control unit,
    wherein the heat sink is provided on the housing.

5. The radiographic image capturing apparatus according to claim 3,
    wherein the housing is housed in the housing unit, and the heat conduction member in contact with one of the control unit and the heat sink is in contact with the housing.

6. The radiographic image capturing apparatus according to claim 1,
    wherein the heat sink is spaced apart from the housing unit and the support unit.

7. The radiographic image capturing apparatus according to claim 1, further comprising:
    an air blower that blows inside air from the inside of the housing unit to the heat dissipation port through a region of a fin of the heat sink.

8. The radiographic image capturing apparatus according to claim 1,
   wherein the support unit comprises a holding unit, which holds the housing unit and has an opening portion allowing the inside of the housing unit and the hollow portion to be a continuous space through the heat dissipation port in a state in which the housing unit is held, and an arm connecting the holding unit and the radiation emission unit to each other between one end and the other end, and
   the hollow portion is provided over an inside of the holding unit and an inside of the arm.

9. A heat dissipation method of a radiographic image capturing apparatus comprising a radiation detector in which a plurality of pixels for accumulating electric charges corresponding to emitted radiation are arranged, a control unit that controls the radiation detector, a radiation emission unit that emits radiation, a housing unit in which the radiation detector and the control unit are housed and which has a radiation detection surface irradiated with the radiation emitted from the radiation emission unit, a support unit that supports the radiation emission unit at a position facing the radiation detection surface, a heat sink that is housed in the housing unit and is thermally coupled to the control unit, a heat dissipation port provided in the housing unit, and a heat conduction member that protrudes further toward the heat dissipation port than the heat sink, the method comprising:
   dissipating heat inside the housing unit from the heat dissipation port to a hollow portion that is provided in the support unit to form a space continuing from an inside of the housing unit through the heat dissipation port.

* * * * *